United States Patent Office 3,215,711
Patented Nov. 2, 1965

3,215,711
2-BROMO-1,4-DIAMINO-5- OR 8-NITRO-ANTHRAQUINONE
Otto Fuchs and Heinz Rentél, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 24, 1962, Ser. No. 212,163
Claims priority, application Germany, July 29, 1961, F 34,571
3 Claims. (Cl. 260—381)

The present invention relates to new valuable disperse dyestuffs of the anthraquinone series and to a process for preparing them; more particularly it relates to dyestuffs of the following general formula

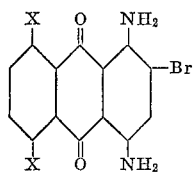

in which one X stands for a hydrogen atom and the other X for the nitro group.

We have found that blue disperse dyestuffs are obtained by exchanging in a 1-amino-2.4-dibromo-5- or -8-nitroanthraquinone the bromine atom standing in the α-position for the amino group. The dyestuffs so obtained have the following constitution:

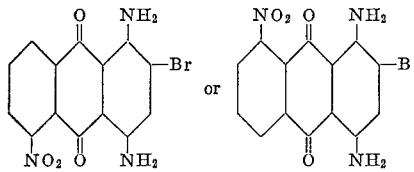

It is suitable to effect the exchange in such a manner that the 1-amino-2.4-dibromo-5- or -8-nitroanthraquinone is condensed with a small excess of toluene-sulfamide in an organic solvent at 100° to 200° C. in the presence of catalytic amounts of copper-(II)-acetate and copper powder. As solvents there are preferably used butyl alcohol, amyl alcohol or cyclohexyl alcohol. The toluene-sulfamido compound obtained by this condensation crystallizes in the form of fine needles on cooling the reaction mixture. The solvent is separated from the reaction product by filtration or distillation with steam.

It is suitable to carry out the hydrolytic splitting off of the toluene-sulfonic acid in such a manner that the condensation product is dissolved in concentrated sulfuric acid at 20° to 30° C., the solution is diluted with water to a content of $H_2SO_4$ of 80%, while cooling, and the hydrolysis is then completed at about 30° C. When the hydrolysis is complete, the reaction mixture obtained is poured on to ice, the precipitated blue dyestuff is filtered off and washed until neutral.

The bromine atom in the α-position can also be exchanged for the amino group by condensing the dibromoanthraquinone with phthalimide and hydrolyzing the reaction product so obtained in concentrated sulfuric acid.

The direct exchange of the bromine atom for ammonia is very difficult due to the great liability of the nitro group present in the molecule, especially with regard to the required purity of the dyestuffs which is obtained by the process described above.

The new dyestuffs are only difficultly soluble in water. In most organic solvents, however, they are readily soluble and give a reddish blue solution. With regard to their application the dyestuffs obtainable by the process of this invention are preferably brought into a state of fine subdivision according to the usual methods with the addition of dispersing and wetting agents. They are suitable for dyeing fibers and foils of synthetic materials, for example cellulose acetate or cellulose triacetate. The novel dyestuffs show a pronounced affinity for shaped structures, such as fibers or foils, of polyethylene terephthalates. The dyeing operation is advantageously carried out in an aqueous suspension in the presence of a carrier at a temperature between about 80° and 100° C. or in the absence of a carrier at a temperature between about 110° and 140° C.

The printing of the structures can be carried out in such a manner that an aqueous printing paste containing the dyestuff is printed on the substratum and steamed in the presence of a carrier at a temperature between about 95° and 110° C. or in the absence of a carrier at a temperature between about 120° and 140° C.

The reddish blue dyeings and prints produced with the new dyestuffs on fibers and foils of synthetic materials, particularly of polyethylene terephthalates, are distinguished by a very good fastness to light, to thermofixation, to ironing, to washing and to solvents.

The following examples serve to illustrate the invention but they are not intended to limit it thereto, the parts being by weight unless otherwise stated, and the relationship of parts by weight to parts by volume being the same as that of the kilogram to the liter.

Example 1

30 parts of 1-amino-5-nitro-2.4-dibromo-anthraquinone were reacted at boiling temperature in 500 parts of butanol with 18 parts of p-toluene-sulfamide in the presence of 9 parts of anhydrous potassium acetate, 0.1 part of copper-(II)-acetate and 0.1 part of copper powder. After a reaction time of about 8 hours the mixture was allowed to cool slowly, the precipitated sulfamido compound was suctioned off and washed with methanol and water.

20 parts of the dried reaction product were dissolved at 20° to 30° C. in 220 parts of concentrated sulfuric acid, 40 parts of ice were added, while cooling, and the mixture was stirred for about 1 hour. The reaction mixture was then poured into about 1000 parts of ice water, the precipitated dyestuff was suctioned off and washed with hot water until neutral. After drying, 15 parts of 1.4-diamino-2-bromo-5-nitroanthroquinone were obtained in the form of a blue powder.

0.3 part of this powder was brought into a state of fine subdivision by known methods after the addition of a suitable dispersing agent, for example the condensation product of naphthalene-2-sulfonic acid and formaldehyde, and dispersed in 3000 parts of water. Into this dye bath 100 parts of a polyethylene terephthalate fabric in the form of loose material, combed material, yarn or piece-goods were introduced and dyed for 1½ hours at 120° C. The dyed material was then treated for 15 minutes at 80° C. in a bath containing per 1000 parts by volume of water 2 parts of sodium dithionite and 2 parts of a non-ionogenic detergent, for example the addition product of ethylene oxide to an alkylphenol, in order to remove the dyestuff adhering at the surface. A clear reddish blue dyeing possessing very good fastness properties was obtained.

Example 2

30 parts of 1-amino-8-nitro-2.4-dibromoanthraquinone were reacted at 140° C. to 150° C. in 250 parts of cyclohexanol with 20 parts of crude toluene sulfamide consisting of about 60% of the para and 40% of the ortho-compound, in the presence of 9 parts of anhydrous potassium acetate, 0.1 part of copper-(II)-acetate and 0.1 part of copper powder. After a reaction time of 6 hours the solvent was removed by distillation with steam, the precipitated reaction product was suctioned off and washed with water and methanol. 20 parts of the sulfamido compound so obtained were dissolved at 20° C. in 200 parts of sulfuric acid-monohydrate, 40 parts of ice were added, while cooling, and the mixture was stirred for 1 hour at 30° C. The reaction mixture was then poured into about 1000 parts of ice water, the precipitated dyestuff was suctioned off and washed with hot water until neutral. After drying, 15 parts of 1.4-diamino-2-bromo-8-nitroanthraquinone were obtained in the form of a reddish blue powder.

10 parts of this powder were brought into a finely divided form by the addition of a suitable dispersing agent, for example the condensation product of 2-hydroxynaphthalene-6-sulfonic acid, cresol and formaldehyde, dispersed in 190 parts of water and the introduced, while stirring, into 300 parts of a thickening, for example on the basis of a suitable kind of natural rubber. With the printing paste so obtained fabrics, knitted fabrics or combed materials of polyethylene terephthalate fibers were printed, dried and fixed in the course of 15 minutes at 1.5 to 2 atmospheres gage. The thickening was then washed out and the print was after-treated by reduction as described in Example 1, in order to obtain the optimum fastness to rubbing. A reddish blue print possessing a very good fastness to washing, to thermofixation, to ironing and to light was obtained.

We claim:
1. Disperse dyestuffs of the following formula

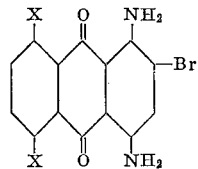

in which one X stands for a hydrogen atom and the other X for the nitro group.

2. The disperse dyestuff of the formula

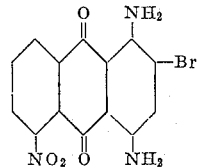

3. The disperse dyestuff of the formula

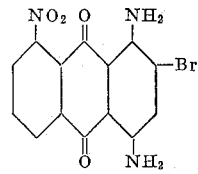

References Cited by the Examiner
UNITED STATES PATENTS
1,924,664  8/33  Fraser et al. _____ 260—381
FOREIGN PATENTS
268,592  12/13  Germany.
268,984  1/14  Germany.

OTHER REFERENCES
Houben: "Das Anthracene und die Anthraquinone," pages 412–413, (1929).

LORRAINE A. WEINBERGER, Primary Examiner.
LEON ZITVER, Examiner.